(12) United States Patent
Quan et al.

(10) Patent No.: US 7,592,917 B2
(45) Date of Patent: Sep. 22, 2009

(54) RFID SYSTEM AND METHOD FOR PROTECTING INFORMATION

(75) Inventors: Chenghao Quan, Jilin Province (CN); Hee-Sook Mo, Daejon (KR); Dong-Han Lee, Daejon (KR); Ji-Hoon Bae, Daejon (KR); Gil-Young Choi, Daejon (KR); Cheol-Sig Pyo, Daejon (KR); Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 354 days.

(21) Appl. No.: 11/592,420

(22) Filed: Nov. 3, 2006

(65) Prior Publication Data
US 2007/0052525 A1 Mar. 8, 2007

(30) Foreign Application Priority Data
Nov. 3, 2005 (KR) .................... 10-2005-0105075

(51) Int. Cl.
*G08B 13/14* (2006.01)
(52) U.S. Cl. .................. 340/572.1; 340/10.4
(58) Field of Classification Search .......... 340/539.1, 340/539.22, 825.69, 825.72, 10.3, 10.52, 340/5.8, 10.4, 10.32, 10.1, 572.1
See application file for complete search history.

(56) References Cited

U.S. PATENT DOCUMENTS 5,832,090 A 11/1998 Raspotnik
6,172,596 B1 * 1/2001 Cesar et al. ............... 340/10.41
6,970,070 B2 * 11/2005 Juels et al. ................. 340/10.1
7,298,243 B2 * 11/2007 Juels et al. ................. 340/10.4
7,359,696 B2 * 4/2008 Tanaka et al. ............... 455/411
2004/0223481 A1 11/2004 Juels et al.

FOREIGN PATENT DOCUMENTS

| JP | 2000-011114 | 1/2000 |
| JP | 2003-317044 | 11/2003 |
| JP | 2004-252621 | 9/2004 |
| JP | 2005-301579 | 10/2005 |
| KR | 100605138 | 7/2006 |

OTHER PUBLICATIONS

Notice of Korean Patent Grant dated May 3, 2007 for the corresponding application KR10-2005-0105075.

* cited by examiner

*Primary Examiner*—Anh V La
(74) *Attorney, Agent, or Firm*—Ladas & Parry LLP

(57) ABSTRACT

Provided is a Radio Frequency identification (RFID) system and method for protecting information. The system includes: an identification information storing unit which includes identification information and generates an interrupt/interference signal to block access without permission; an RFID calling unit which reads information of the identification information storing unit by loading a basic protocol and a security protocol for recognizing the identification information storing unit; and a storing unit which registers and stores information required for authentication between the RFID calling unit and the identification information storing unit, and information required for access control.

14 Claims, 2 Drawing Sheets

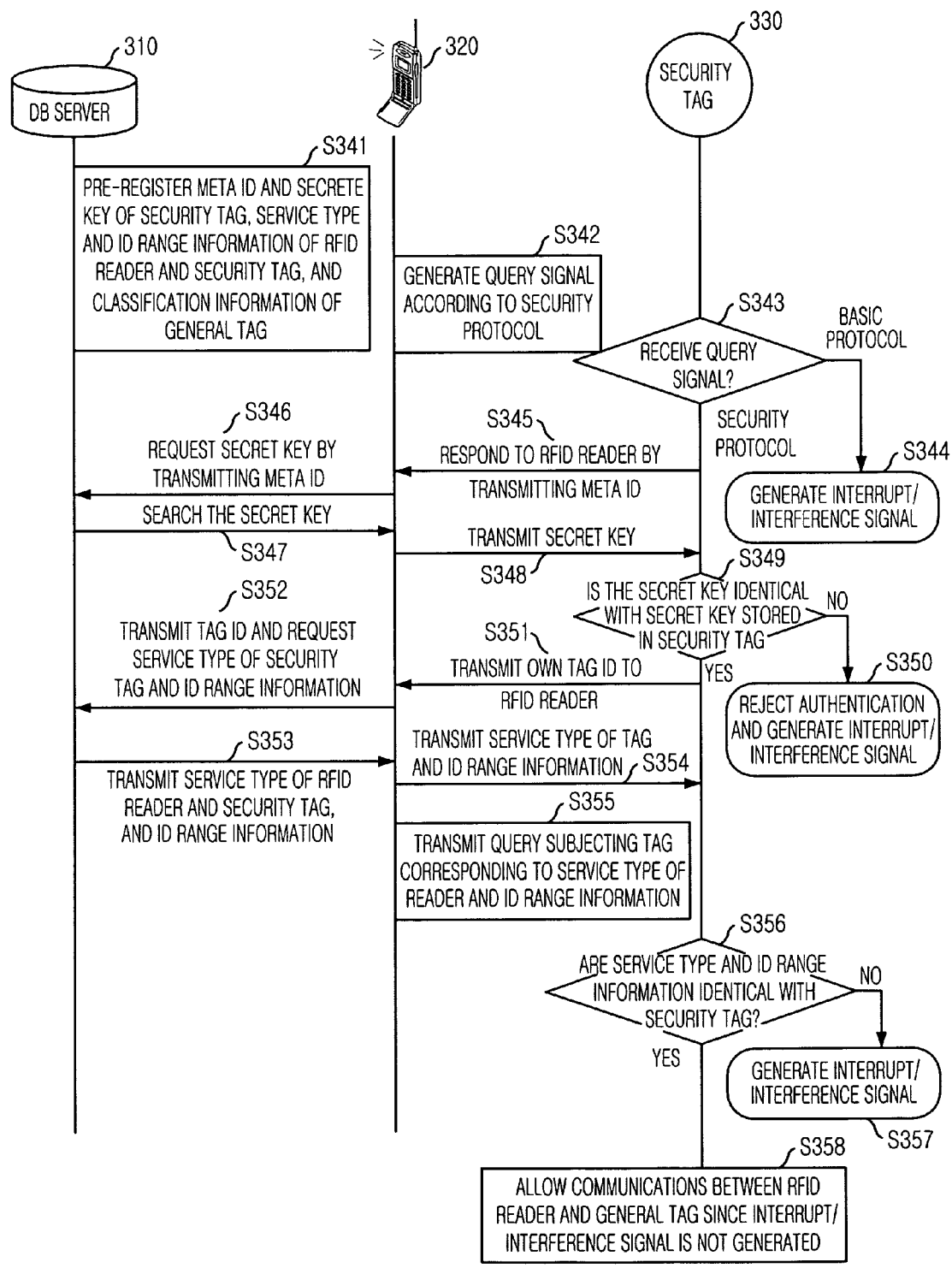

RFID SYSTEM AND METHOD FOR PROTECTING INFORMATION

FIELD OF THE INVENTION

The present invention relates to a Radio Frequency identification (RFID) system and method for protecting information; and, more particularly, to an RFID system and method for protecting information which can improve a function for protecting privacy of an RFID tag owner and securing RFID tag information by giving access to only a permitted reader.

DESCRIPTION OF RELATED ART

In general, Radio Frequency Identification (RFID) is a technology for recognizing/tracing/managing materials, animals and people having an RFID tag by deriving or recording information without contact from an RFID tag having identification information based on a wireless frequency. An RFID system is composed of a plurality of tags of identification information attached to an object or an animal including an electronic tag and a transponder, and an RFID reader for reading and writing information of the RFID tag such as an RFID reader or an interrogator. The RFID system is divided into a mutual inducing method and an electromagnetic wave method based on a mutual communicating method between an RFID reader and the RFID tag. Also, the RFID system is divided into an active type and an inactive type based on whether the RFID tag is operated by tag's power or not. The RFID system also can be divided into a long wave, a medium wave, a short wave and an ultra short wave. Diverse kinds of references are made or being made according to the above division.

FIG. 1 is a standardized searching and accessing procedure between the RFID reader and the RFID tag in the general RFID system. The RFID reader 110 wirelessly transmits Query/QueryAdjust/QueryRep to the RFID tag 120 to access to the RFID tag 120 at step S131. When an RFID tag's time slot randomly starting and continuously reducing as much as 1 becomes "0", the RFID tag 120 transmits a 16-bit random value (RN16) at step S132 as a response to the RFID reader 110. The RFID reader 110 approves the RFID tag 120 at step S133 by generating the same signal as the RN16. The tag 120 checks whether the transmitted RN16 is the identical with RN16 issued by the RFID tag 120 or not. When the transmitted RN16 is identical with the RN16 issued by the RFID tag 120, the RFID tag 120 responds by transmitting protocol control (PC) information and Electronic Product Code (EPC) at step S134.

The RFID reader 110 generates a "Req_RN" signal including the RN16 to request for access to the RFID tag 120 at step S135. The tag 120 checks whether the RN16 is identical with the RN16 issued by the RFID tag 120 or not. When the RN16s are identical, the RFID tag 120 responds by transmitting a handle, i.e., a 16-bit tag authentication signal at step S136. When the RFID reader 110 accesses to the RFID tag 120 based on an access command at step S137, the handle provided by the RFID tag 120 is used as a parameter in each access command. The tag 120 checks whether the handle is identical with the handle issued by the RFID tag 120 or not, and determines whether to perform or reject the access command.

However, as described above, since the RFID reader can access to a certain tag without any limitation, there is a problem that secret information of a person and a public institution can be indiscriminately exposed without any limitation in consideration of a present condition that rapid supply of a mobile phone with the RFID reader is visualized.

SUMMARY OF THE INVENTION

It is, therefore, an object of the present invention to provide a Radio Frequency identification (RFID) system and method for protecting information which can improve a function for protecting a privacy of an RFID tag owner and securing RFID tag information by giving access to only a permitted reader accessible.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided an RFID system for protecting information, the system including: an identification information storing unit which includes identification information and generates an interrupt/interference signal to block access without permission; an RFID calling unit which reads information of the identification information storing unit by loading a basic protocol and a security protocol for recognizing the identification information storing unit; and a storing unit which registers and stores information required for authentication between the RFID calling unit and the identification information storing unit, and information required for access control.

In accordance with another aspect of the present invention, there is provided with a method for protecting information in an RFID system, the system including the steps of: a) registering information on authentication and access control of an RFID reader loading a security protocol in a data server and a security tag; b) performing mutual authentication between the RFID reader and the security tag to access to RFID tag information; c) when the mutual authentication is successful, receiving information on the access control from a data server in the RFID reader and the security tag, and performing service matching for usage inspection of the RFID reader and the security tag and ID range matching for ID range inspection; and d) permitting communications when information of the security tag is the same as information of the RFID reader in the step c).

BRIEF DESCRIPTION OF THE DRAWINGS

The above and other objects and features of the present invention will become apparent from the following description of the preferred embodiments given in conjunction with the accompanying drawings, in which:

FIG. 3 is a flowchart describing an information protecting method in the RFID system in accordance with an embodiment of the present invention.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
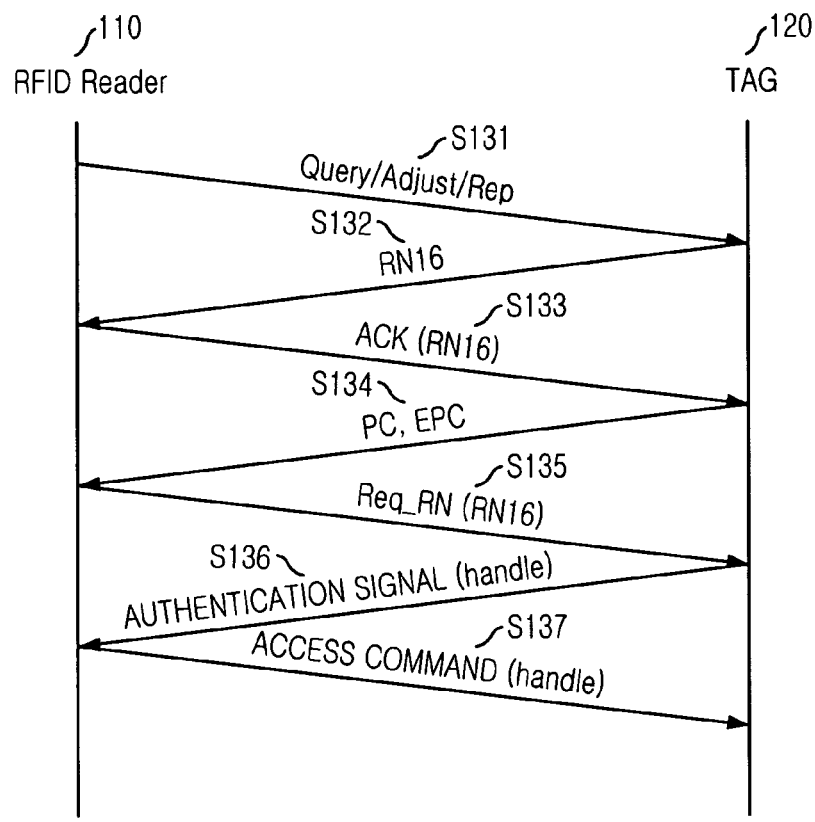
FIG. 1 is a standardized searching and accessing procedure between a Radio Frequency identification (RFID) reader and an RFID tag in a general RFID system.
Figure 2:
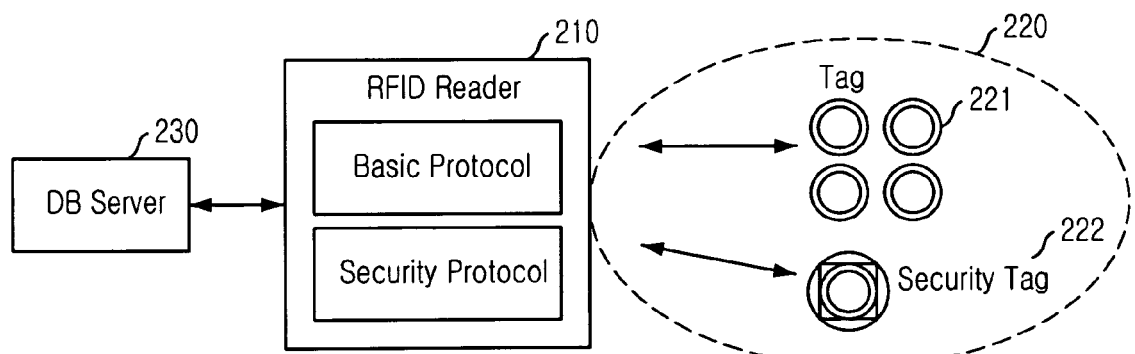
FIG. 2 is the RFID system for protecting information in accordance with an embodiment of the present invention.

FIG. 2 is a Radio Frequency identification (RFID) system for protecting information in accordance with an embodiment of the present invention. The RFID system for protecting information includes an RFID tag 220, an RFID reader 210 and data server (DB) Server 230.

The tag 220 includes unique identification (ID) information and generates an interrupt/interference signal to block access without permission.

The RFID reader 210 reads information of the RFID tag 220 by loading a basic protocol and a security protocol for recognizing the RFID tag 220.

The DB Server 230 registers and stores information required for authentication between the RFID reader 210 and the RFID tag 220 and information required for access control.

The RFID reader 210 can be divided into an RFID reader loading only a basic protocol and an RFID reader loading a security protocol as well as the basic protocol. The basic protocol means a module realized based on an RFID air interface reference. For example, there are a protocol following a second generation (Gen2) RFID standard spec and a protocol following "ISO 18000-6 A" type standard.

The tag 220 is divided into an RFID tag 221 with a general meaning and a security tag 222. The security tag 222 performs authentication between the RFID reader 210 and the RFID tag 220, and blocks access without permission.

The DB Server 230 functions as a storage for registering/storing information required for authentication between the RFID reader 210 and the security tag 222 and information required for access control and providing the information upon request of the RFID reader 210. That is, information on authentication or access control of the RFID reader 210 loading a security protocol and the security tag 222, i.e., meta ID and a secrete key of the security tag, a service type of the RFID reader 210 and the security tag 222, ID range information or classification information based on an ID classification system of the general tag are registered in the DB Server 230.

The DB Server 230 and the RFID reader 210 can be connected through a wired/wireless communication network.

The RFID reader 210 performs mutual authentication with the security tag 222 to access the information of the RFID tag 220. When the mutual authentication is successful, each of the RFID reader 210 and the security tag 222 receives information on the access control from the DB Server 230 and performs service matching for inspecting usage of the RFID reader 210 and the security tag 222, and ID range matching for inspecting an ID range.

The security tag 222 can permit or block the access of the RFID reader 210 according to the matching result. Also, the security tag 222 receives a command of the RFID reader 210 in real-time, performs the ID range matching, and blocks the access to the RFID tag in the ID range without permission.

As described above, there is a benefit that the present invention provides flexibility on the mutual authentication and the access control by changing information stored in the DB Server 230 without amending the RFID reader 210 or the security tag 222, and can accept diverse basic protocols without change.

FIG. 3 is a flowchart describing an information protecting method in the RFID system in accordance with an embodiment of the present invention. It shows an authentication procedure between the RFID reader and the security tag.

In the information protecting method of the RFID system, information on authentication or access control of an RFID reader 320 loading the security protocol in a data server 310 or a security tag 330, e.g., meta ID and a secrete key of the security tag 330, a service type of the RFID reader 320 and the security tag 330, ID range information and classification information based on an ID classification system of the general tag, are pre-registered at step S341.

The RFID reader 320 loading only the basic protocol tries to communicate with the RFID tag according to a procedure defined in the basic protocol. When the security tag 330 does not exist in the region of the RFID reader 320, the RFID reader 320 communicates with the RFID tag according to the procedure defined in the basic protocol. Otherwise, the RFID reader 320 loading the security protocol generates a query signal at step S342 for authentication between the RFID reader 320 and the security tag 330 before communicating with the general tag.

When a certain query signal is transmitted, the security tag 330 determines at step S343 whether the query signal subjects the general tag or the security tag 330 for security authentication. When the query signal subjects the general tag, the query signal is considered as the RFID reader 320 without permission, and an interrupt/interference signal, which interrupts communication between the RFID reader 320, and the general tag are generated at step S344. There are diverse types of the interrupt/interference signal. For example, there is a method that the general tag continuously responds for all slots of a time permitted for response and generates a collision with other general tag such that the RFID reader cannot check the response of the general tag.

When it turns out that the transmitted query signal subjects the security tag 330, the security tag 330 responds to the RFID reader 320 at step S345 by transmitting the meta ID stored in the memory with the secret key in production.

The RFID reader 320 transmits the meta ID transmitted from the security tag 330 to the data server 310 and requests transmission of the secret key for the security tag 330 at step S346. The data server 310 searches own database, inquires a corresponding secret key, and responds by transmitting secret key information corresponding to the RFID reader at step S347. The RFID reader 320 requests authentication for access by transmitting the secret key transmitted from the data server 310 to the security tag 330 at step S348.

The security tag 330 checks at step S349 whether the secret key transmitted from the RFID reader 320 is identical with the secret key stored in the security tag 330 or not, and performs or rejects authentication. When the security tag 330 performs the authentication, the security tag 330 transmits own tag ID to the RFID reader 320 at step S351. When the security tag 330 rejects the authentication, the security tag 330 does not transmit the RFID tag ID and the interrupt/interference signal is generated at step S350. Accordingly, it is assumed that the security tag 330 has a function for mutual authentication with the RFID reader 320 and is less limited than the general tag in a size, power, computing power and a memory. The RFID reader 320, which fails to be authenticated in this procedure, should not try to access to the RFID tag. Although the RFID reader 320 tries to access the RFID tag, the access to the general tag without permission is blocked because the security tag 330 continuously generates the interrupt/interference signal.

When the mutual authentication is performed, the RFID reader 320 transmits the RFID tag ID transmitted from the security tag 330 to the data server 310, and requests the data server 310 information required for future access control at step S352. The data server 310 correspondingly transmits pre-registered and stored service type information for usage inspection in each of the RFID reader 320 and the security tag 330, and ID range information for ID range inspection to the RFID reader 320 at step S353. The RFID reader 320 stores own information and transmits service type information or ID range information on the security tag 330 to the security tag 330 at step S354.

The RFID reader 320 transmits a query subjecting an RFID tag corresponding to own service type and ID range information at step S355. The security tag 330 checks at step S356 whether the service type and the ID range information agree with the security tag 330 or not. When the service type and the ID range information agree with the security tag 330, communications between the RFID reader 320 and the general tag are allowed since the interrupt/interference signal is not generated at step S358. Otherwise, the security tag 330 generates the interrupt/interference signal at step S357 such that it is blocked that the RFID reader 320 accesses to the general tag.

Service matching and ID range matching as a check procedure of service type information and ID range information will be described in detail.

The service matching is a kind of access control which is performed to inspect usage of the RFID reader and the security tag. In this information protecting method of the present invention, the RFID reader and the security tag can be classified into Any, Public, Trade or Private usage as shown in Table 1. It is possible to use the RFID reader and the security tag only for fixed usage based on the classification.

TABLE 1

| RFID Reader | | Security tag Protecting | | | |
|---|---|---|---|---|---|
| | | Any | Public | Trade | Private |
| Reading | Any | ○ | ○ | ○ | ○ |
| | Public | ○ | ○ | X | ○ |
| | Trade | ○ | X | ○ | ○ |
| | Private | ○ | X | X | ○ |

For example, when the RFID reader is set up to be used only in a public place, the RFID reader can be used only in the public place such as a library and a exhibition hall. A security tag only for private usage is used to limit access to the RFID tag attached to personally owned materials to protect the privacy of the RFID tag. When the mutual authentication is successful, the RFID reader and the security tag performs matching on the service type transmitted from a data server. When the RFID tag is accessible according to the result of the Table 1, ID range matching of a next step is performed. Otherwise, the RFID reader notifies information on inaccessibility to an upper level and should not try to access to the RFID tag. The security tag blocks the access to the RFID tag without permission by generating the interrupt/interference signal. When a personally owned mobile reader is used in a public place, usage change application is individually required. Otherwise, only an RFID reader provided in a public place should be used. It is possible to perform service type matching on the security tag carried to protect personally owned materials and the public reader. However, the security tag cannot access to information on an RFID tag for protection. Access is prevented through the ID range matching.

The ID range matching is a kind of access control performed to inspect the ID range of the RFID reader and the security tag. In the information protecting method of the present invention, the RFID reader and the security tag are divided into All, Nothing and Range as following Table 2, and can be used only in a predetermined ID range.

TABLE 2

| RFID Reader | | Security tag Protecting | | |
|---|---|---|---|---|
| | | All | Nothing | Range |
| Reading | All | X | ○ | Δ |
| | Nothing | X | X | X |
| | Range | X | Δ | Δ |

For example, when the RFID reader is set up to read only a specific item of a specific company, the RFID reader should not try to read other items of other companies or the same company. Inversely, when the security tag is set up to protect only a specific item of a specific company, the RFID reader can read other items of other companies.

The RFID reader whose service matching is successfully performed and the security tag perform matching on the ID range type transmitted from the data server and determine to access to the RFID tag based on the result of the Table 2. When the RFID tag is inaccessible, the RFID reader notifies information on the inaccessibility to an upper level and should not try to access to the RFID tag.

When there is an access to the RFID tag without permission, the security tag blocks the access by generating the interrupt/interference signal. When the access is permitted, the RFID reader can transmit/receive information based on the general tag and the basic protocol. When the ID range of the RFID reader dependant on the matching result includes the ID range of the security tag, the access is blocked. For example, the RFID reader set to be able to read all ranges of the RFID tag should pre-select an RFID tag to read only a part excluding a specific range in the ID range to prevent interference/interrupt of the security tag used to protect a specific range. Although this function is not supported by all basic protocols, most protocols support a selection command.

When mutual authentication between the RFID reader and the security tag is successful and matching for access control is performed, the RFID reader tries to communicate with the RFID tag based on the basic protocol. Also, the range of the RFID tag ID should be designate such that only a permitted tag can be read as performed in the ID range matching. Gen2 RFID standard spec can designated an identification range such that only a specific tag can be selected in a plurality of tags based on the selection command. The security tag receives the selection command of the RFID reader and performs matching of the ID range in real-time, thereby blocking the access to the RFID tag of the ID range without permission.

A form for operating the information protecting method in the RFID system of the present invention is broadly described. The tables 1 and 2 can also be realized by other classifying methods.

Since only a permitted RFID reader is accessible to the RFID tag, the present invention can provide functions for protecting privacy of an RFID tag owner and securing RFID tag information. Also, the present invention provides flexibility in mutual authentication or access control by changing information stored in the data server without modification of the RFID reader or the security tag. Since the present invention can accept diverse basic protocols without modification, a range of application is wide.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application No. 2005-0105075, filed with the Korean Intellectual Property Office on Nov. 3, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A Radio Frequency Identification (RFID) system for protecting information, comprising:
   an identification information storing means which includes identification information and generates an interrupt/interference signal to block access to identification information without permission;
   an RFID calling means which loads a basic protocol and a security protocol for recognizing the identification information storing means for reading information of the identification information storing means; and
   a storing means for registering and storing information required for authentication between the RFID calling means and the identification information storing means, and information required for access control.

2. The system recited in claim 1, wherein the identification information storing means includes the identification information, and security information necessary for authenticating the RFID calling means and blocking the access without permission.

3. The system recited in claim 1, wherein the RFID calling means loads a basic protocol realized based on an RFID standard, and a security protocol based on information protection.

4. The system recited in claim 1, wherein the string means functions as storage of information for registering, storing and providing information required for authentication between the RFID calling means and the identification information storing means and information required for access control upon request of the RFID calling means, and
   wherein the storing means includes meta identification (ID) and a secret key of the identification information storing means, a service type and ID range information of the RFID calling means and the identification information storing means, and classification information based on an ID classification system of the general identification information storing means.

5. A method for protecting information in a Radio Frequency Identification (RFID) system having a computer-readable medium used in association with a computing device which includes a process and a memory, the computer-readable medium including computer instructions which are configured to cause the computing device to protect information in the RFID system, the system comprising:
   registering information on authentication and access control of an RFID reader loading a security protocol in a data server and a security tag;
   performing mutual authentication between the RFID reader and the security tag to access to RFID tag information;
   when the mutual authentication is successful, at the RFJD reader and the security tag receiving information on the access control from the data server, and performing service matching for usage inspection of the RFID reader and the security tag and ID range matching for ID range inspection; and
   permitting communications of identification of the RFID tag information when information of the security tag is the same as information of the RFID reader.

6. The method as recited in claim 5, further comprise meta identification (ID) and a secret key of the security tag, a service type of the RFID reader and the security tag, ID range information and classification information based on an ID classification system of a general tag are pre-registered.

7. The method as recited in claim 5, wherein the performing mutual authentication between the RFID reader and the security tag to access to the RFID tag information comprises:
   generating a query signal for authentication of the security tag;
   at the security tag, determining whether the query signal generated subjects a general tag or the security tag for security authentication;
   When the query signal subjects the general tag, considering the RFID reader as a non-permitted reader and generating an interrupt/interference signal for interrupting communications between the RFID reader and the general tag, and when the query signal subjects the security tag responding by transmitting ID stored in the security tag to the RFID reader
   at the RFID reader, transmitting the ID received from the security tag to the data server, requesting to transmit the secret key for the security tag, at the data server, retrieving a secret key corresponding to the secret key on the own data, responding by transmitting secret key information corresponding to the RFID reader and requesting authentication for access by transmitting the secret key that the RFID reader receives from the data server to the security tag; and
   checking whether or not the secret key transmitted in the the RFID reader is identical with the secret key stored in the security tag or not, transmitting the RFID tag ID of the security tag when the secret keys are identical, and generating an interrupt/interference signal when the secret keys are not identical.

8. The method as recited in claim 7, wherein in the generating a query signal for authentication of the security tag further comprises:
   the RFID reader loading only a basic protocol tries to communicate with the RFID tag according to a procedure defined in the basic protocol, and when the security tag does not exist in a region of the RFID reader, the RFID reader communicates with the RFID tag based on the procedure defined in the basic protocol 9. The method as recited in claim 7, wherein the security tag includes a function for mutual authentication with the RFID reader and is less limited than the general tag in a size, power, computing power and a memory.

10. The method as recited in claim 7, wherein the interrupt/interference signal generate a collision with other general tag by continuously responding to all slots for a time allowed by the general tag such that the RFID reader cannot check response of the general tag.

11. The method as recited in claim 7, wherein the mutual authentication is successful further comprises:
   confirming that the mutual authentication is performed, at the RFID reader, transmitting the RFID tag ID received from the security tag to the data server and requesting information required for future access control to the data server, at the data server transmitting to the RFID reader, the previously registered and stored service type information for usage inspection and the ID range information for ID range inspection with respect to each of the RFID reader and the security tag upon request;

storing information on the RFID reader among information transmitted in the RFID reader, and transmitting service type information and ID range information on the security tag to the security tag; and transmitting a query subjecting an RFID tag corresponding to the service type of the RFID reader and the ID range information, and at the security tag determining whether or not the service type and the ID range information are identical to those of the security tag.

12. The method as recited in claim 7, wherein the permitting communications of identification of the RFID tag information further comprises that when information of the security tag is the same as information of the RFID reader when the service type and the ID range information are identical to those of the security tag, communications between the RFID reader and the general tag are allowed by not generating the interrupt/interference signal, and when the service type and the ID range information are not identical, the RFID reader is prevented to access to the general tag by generating the interrupt/interference signal.

13. The method as recited in claim 7, wherein the service type is a kind of access control for inspecting usage of the RFID reader and the security tag, can be classified into Any, Public, Trade and Private based on the usage of the RFID tag and the RFID reader and the security tag, and can be used only for a predetermined usage based on the classification.

14. The method as recited in claim 7, wherein the ID range is a kind of access control for inspecting usage of the RFID reader and the security tag, can be classified into All, Nothing and Range based on the usage of the RFID reader and the security tag, and can be used only in a predetermined ID range.

* * * * *